United States Patent Office 2,765,768
Patented Oct. 9, 1956

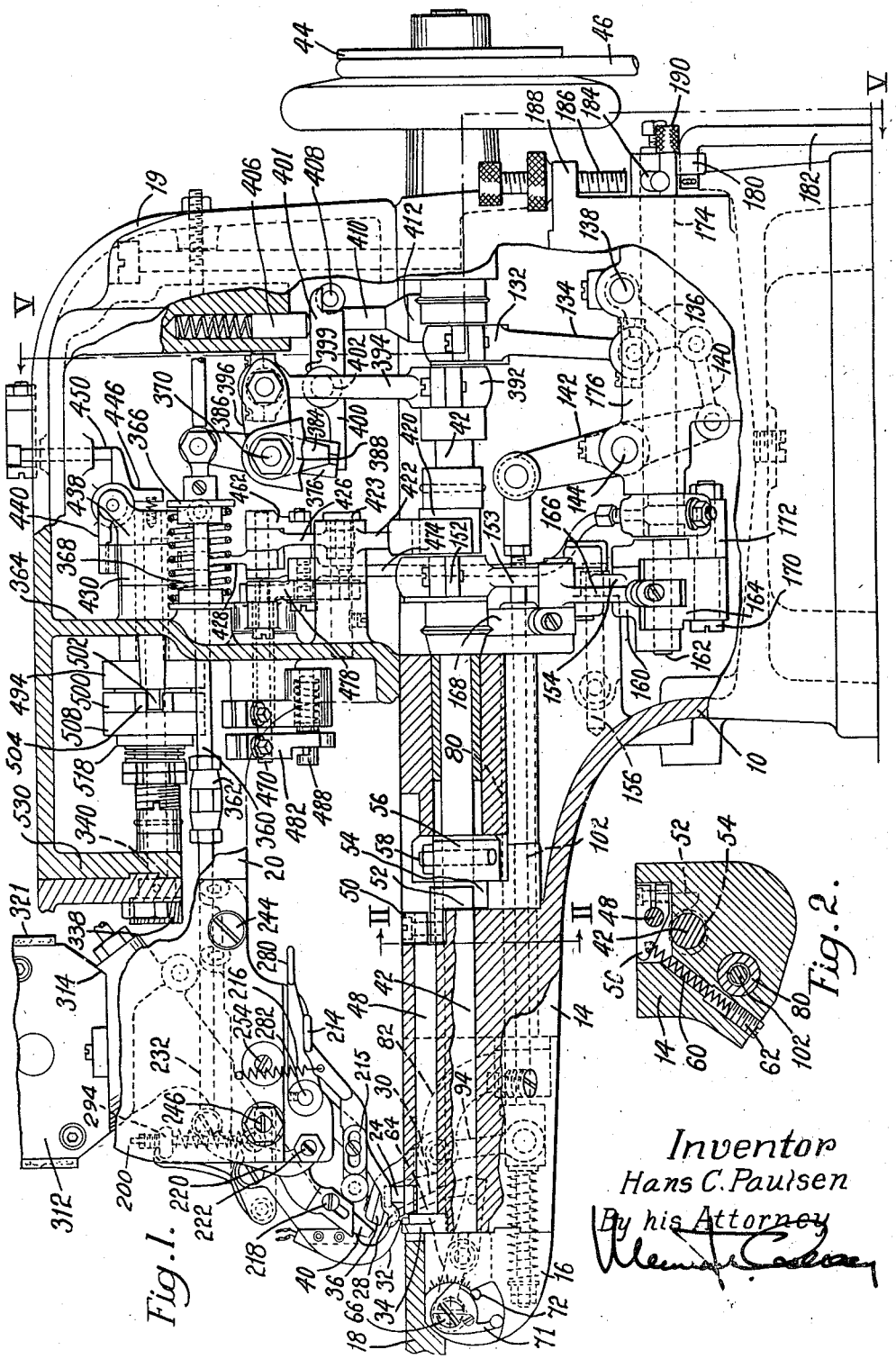

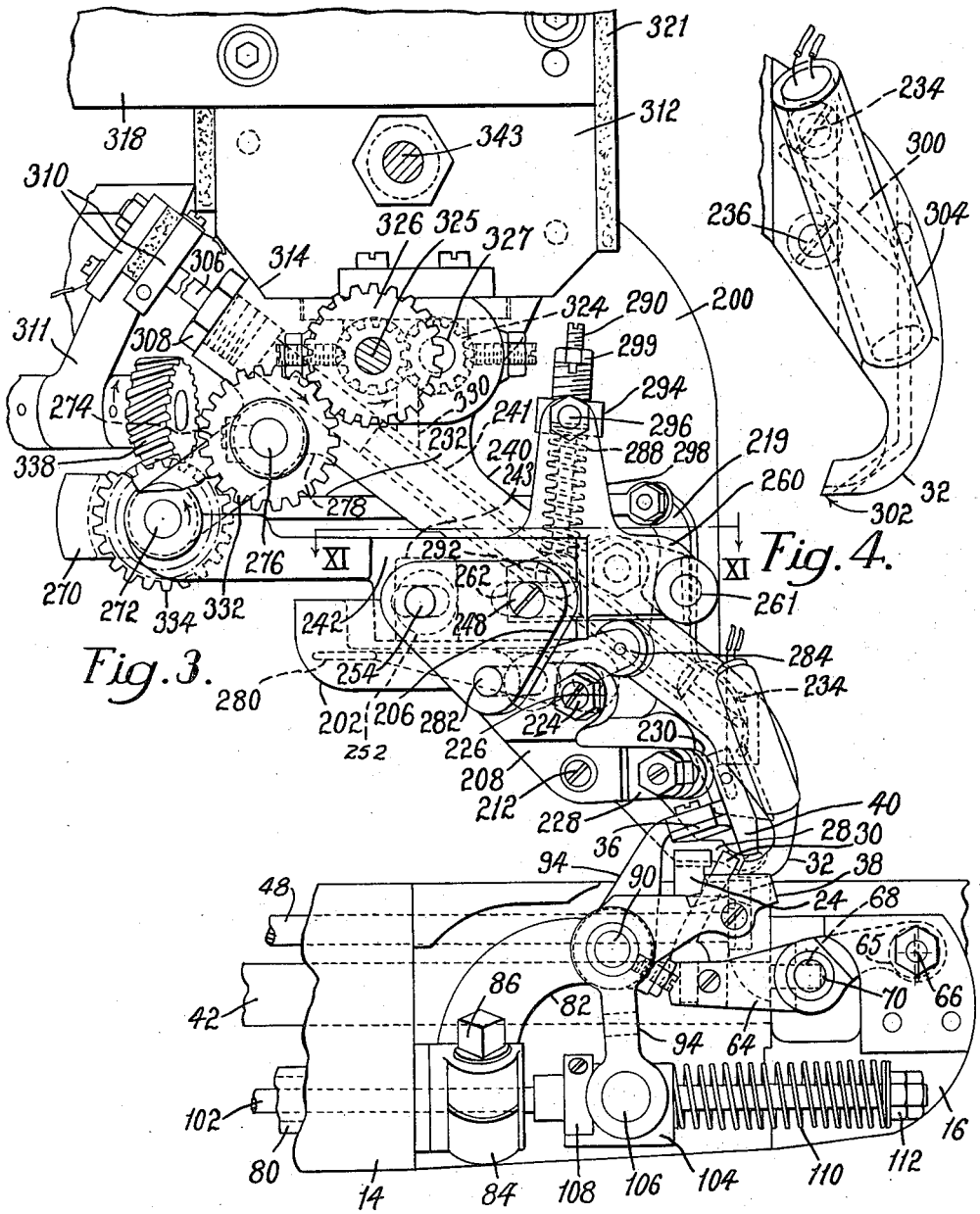

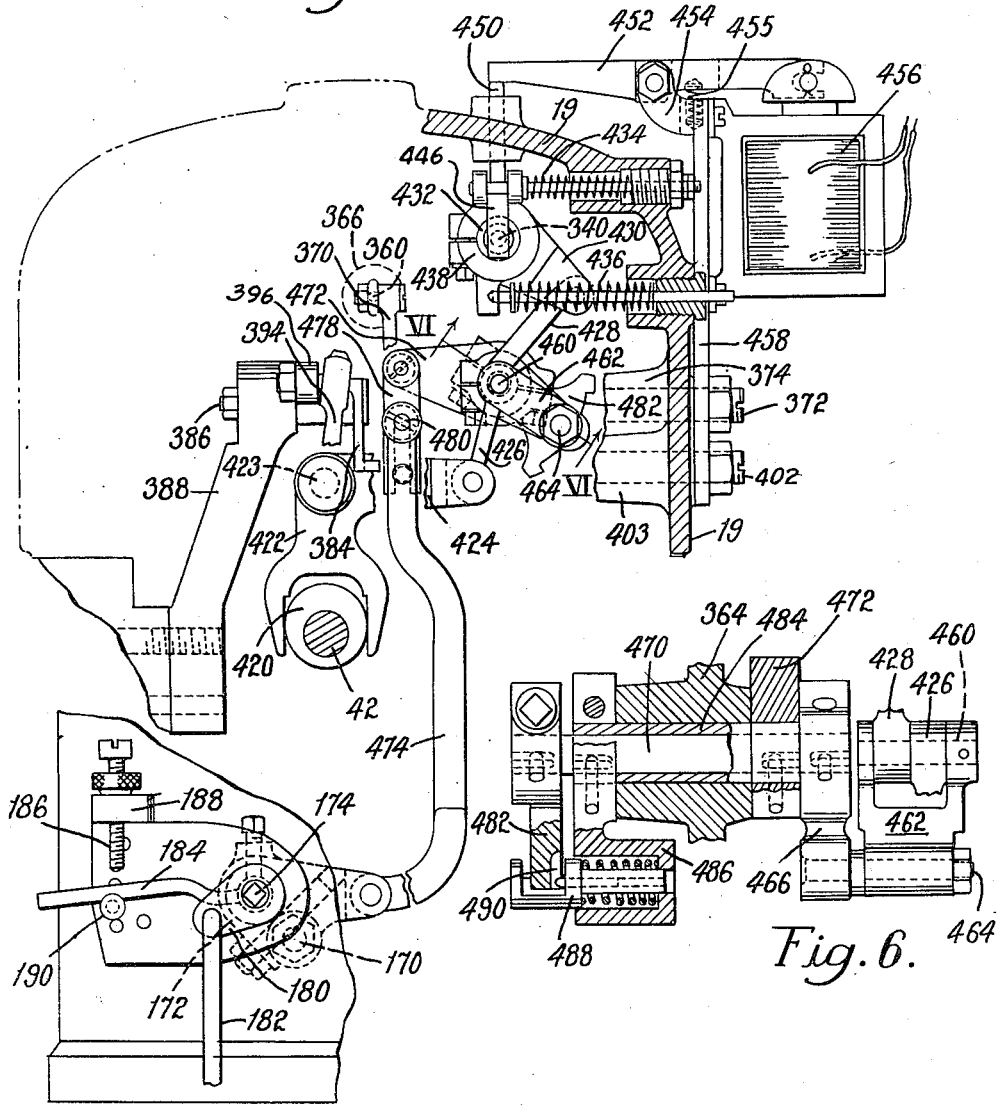

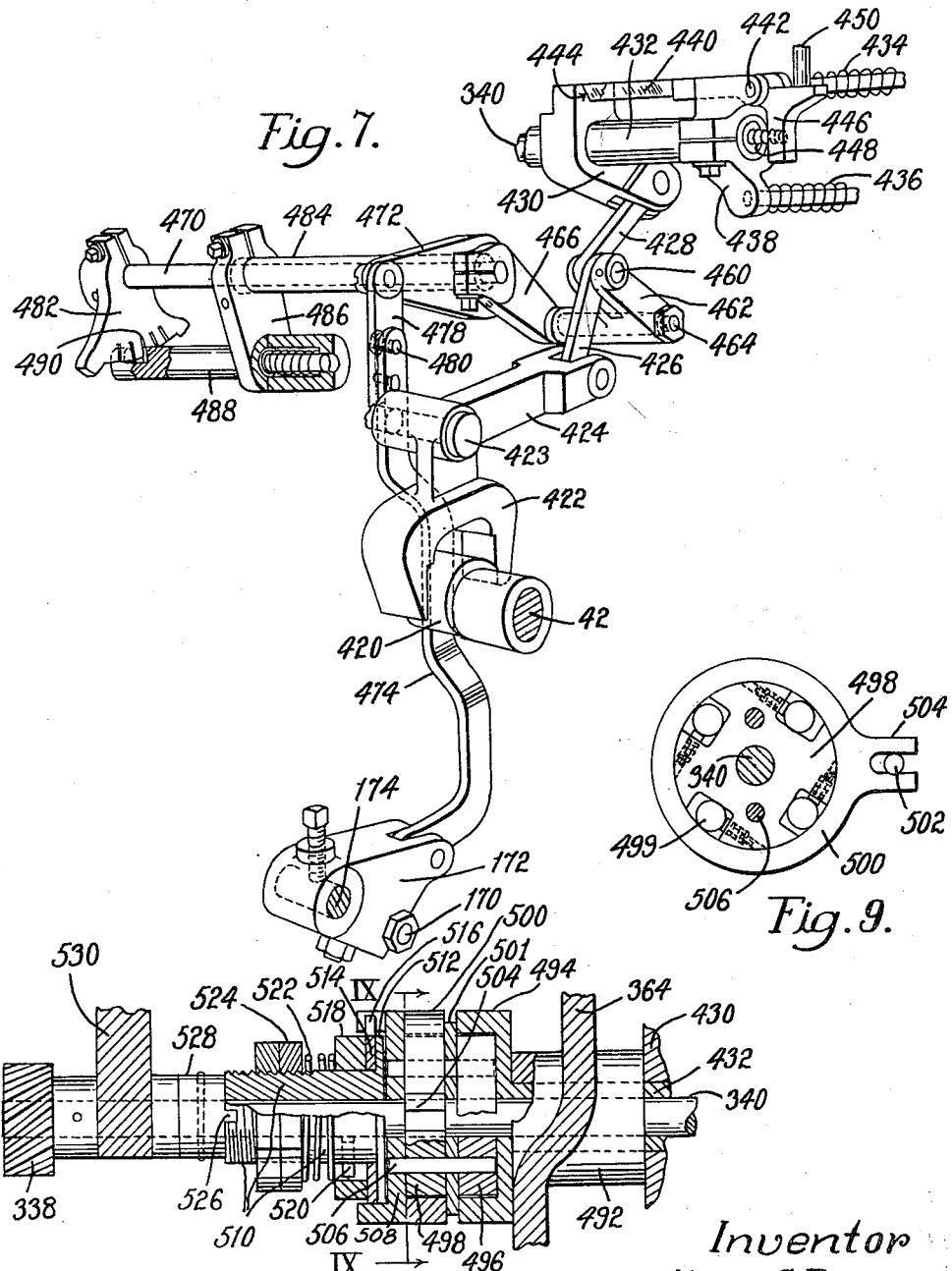

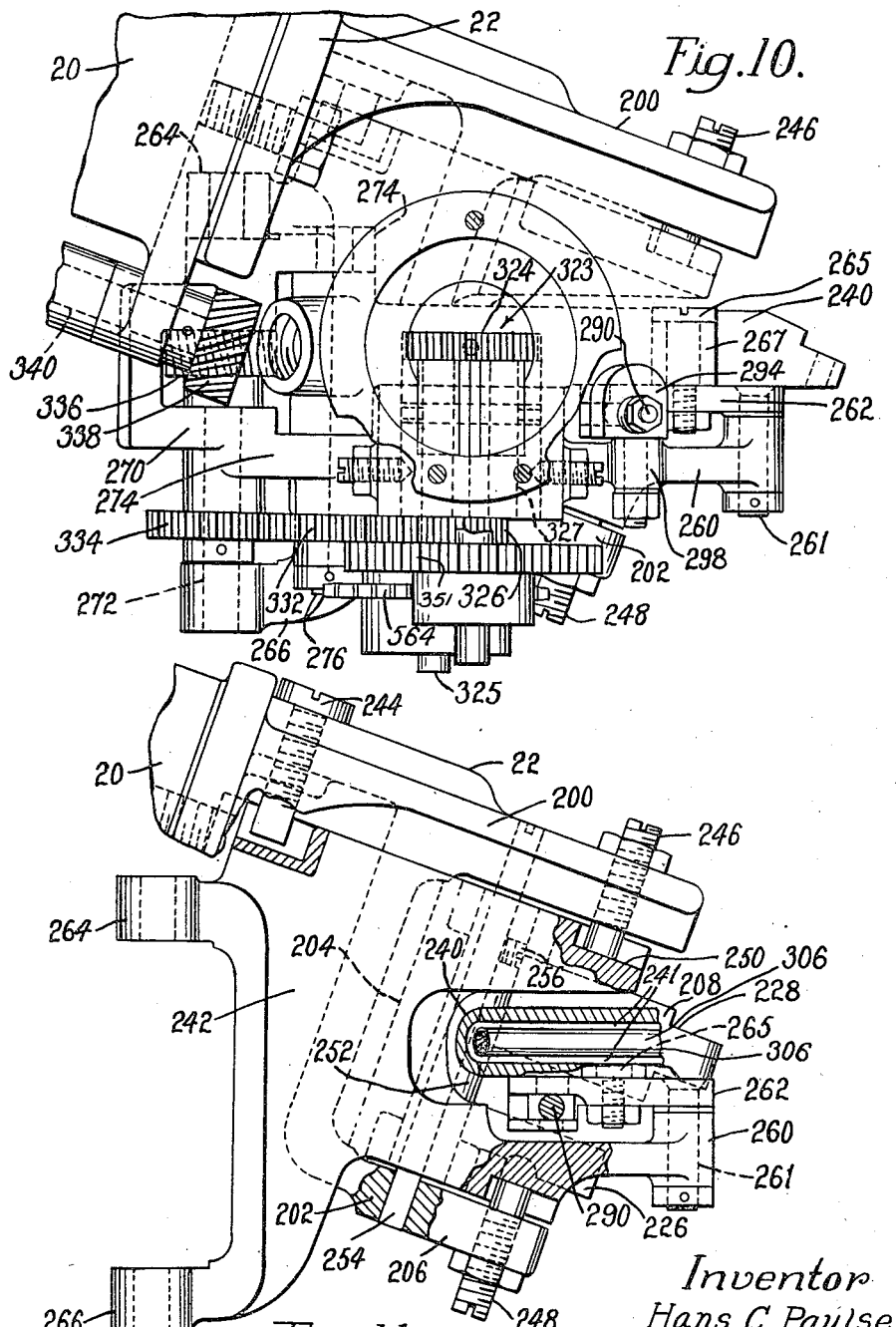

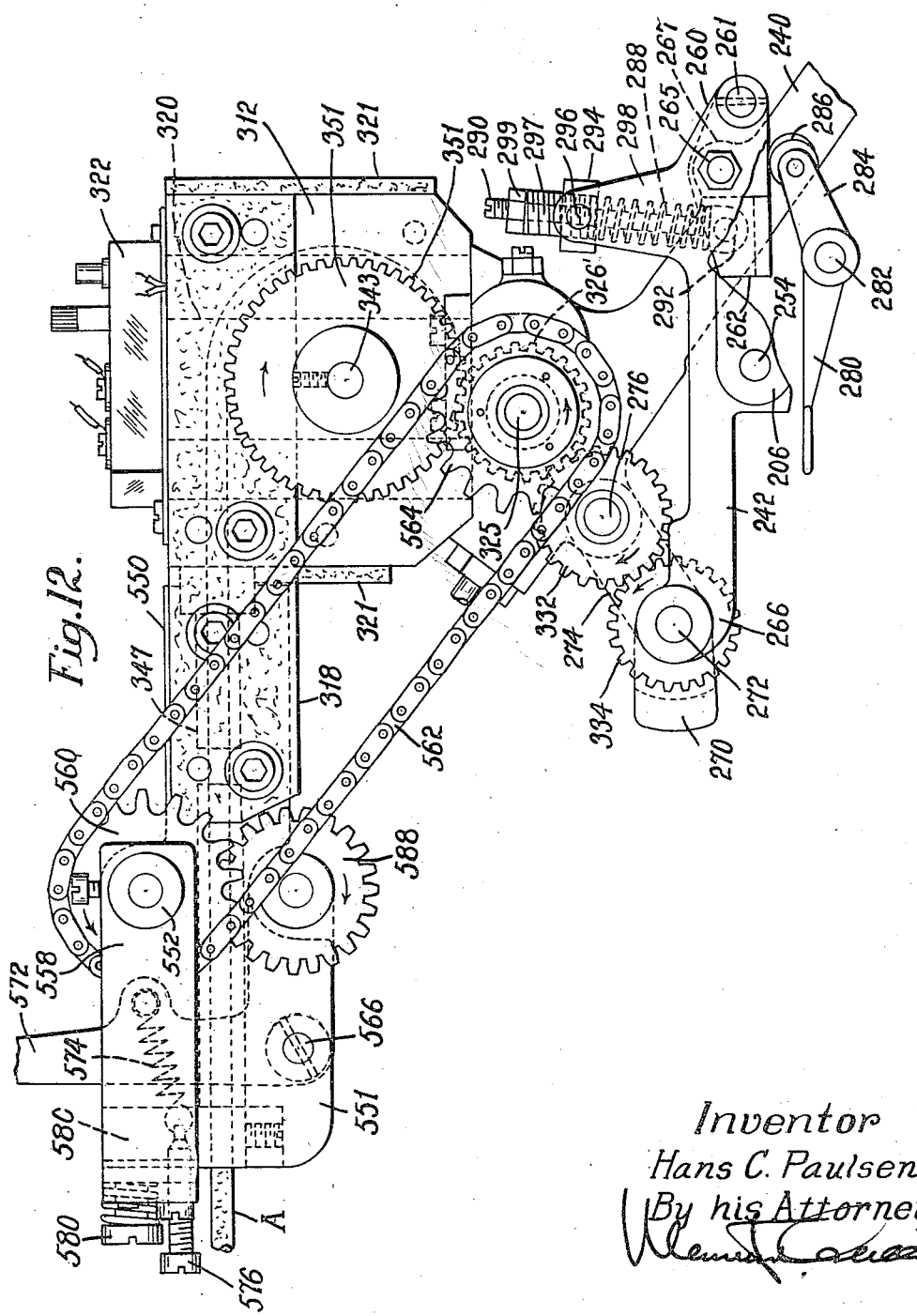

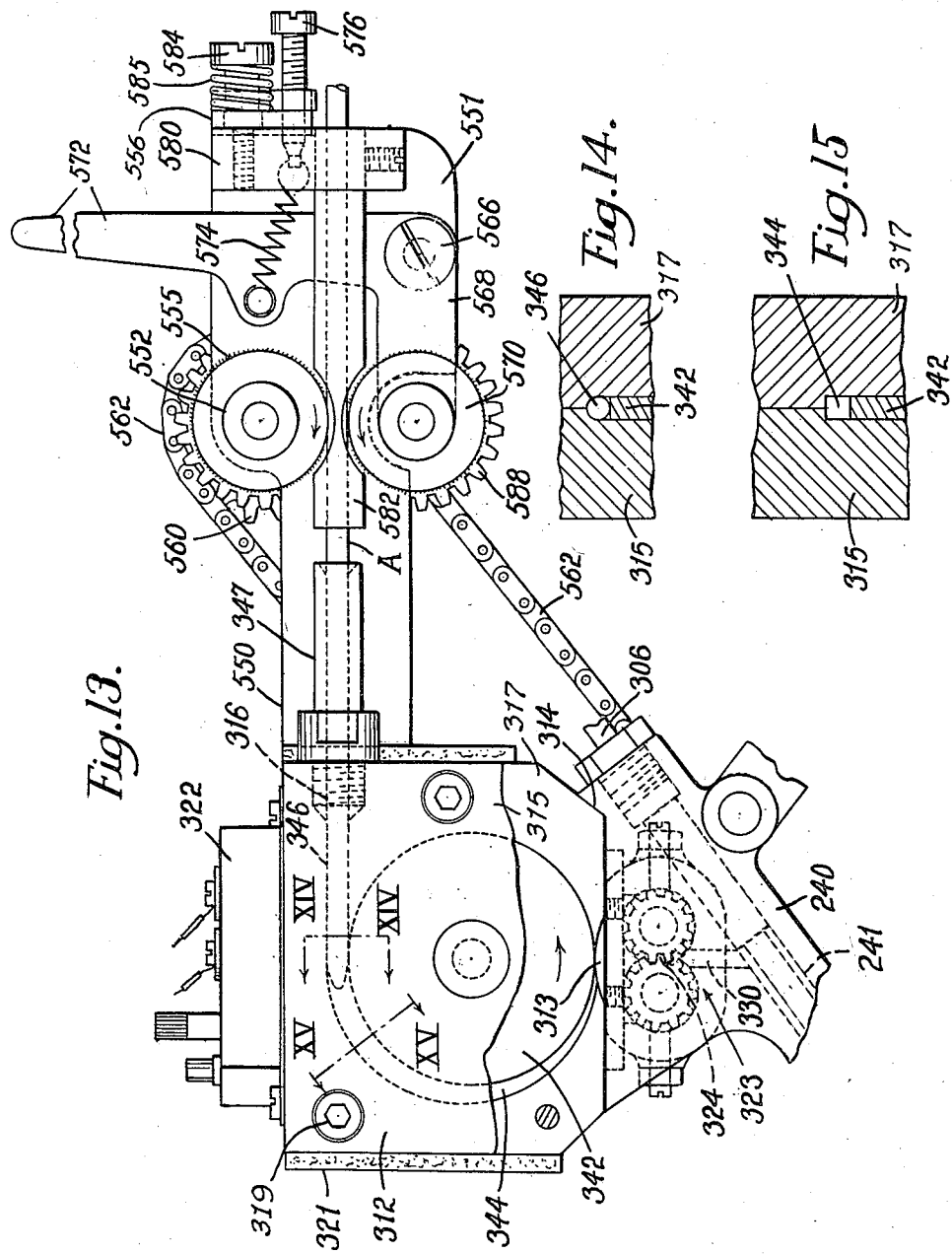

2,765,768

CEMENT HANDLING APPARATUS

Hans C. Paulsen, Medford, Mass., assignor to United Shoe Machinery Corporation, Flemington, N. J., a corporation of New Jersey Application January 6, 1953, Serial No. 329,810

14 Claims. (Cl. 118—410)

This invention relates to apparatus for handling and heating a thermoplastic cement, prior to its application to a piece of work, and to a folding machine in which such an apparatus is embodied.

The value of thermoplastic adhesives has long been appreciated because it has been found that the bond which is secured is very tenacious and because the quick hardening properties of the cement are valuable in cases where the application to the work is progressive and where the bonding of the parts follows immediately. Nevertheless, the extensive utilization of such cements has been hindered by difficulties which arise in bringing the cement to a liquid state as fast as is needed for use without causing a deterioration of the material. It will be understood that, in general, the thermoplastic adhesives in common use are solid at room temperature and become liquid when heated. Such cements can readily be compounded from a variety of materials, thus enabling the composition of the cement to be adjusted for the particular purpose at hand and having regard for the keeping properties of the finished compound. One of the most obvious ways of melting the cement is by use of a heated receptacle or pot but when this is done it is very difficult to initially heat the mass of material because of the heat insulating properties of the adhesive itself, resulting in a serious delay at the start of a day's work. Furthermore, such arrangements, if they are to be employed day in and day out, are likely to cause a deterioration or "cooking" of the material to a point where it breaks down and is no longer useful. Another difficulty arises from the tenacious properties of the material, when it is desired to clean the pot in which it has been heated.

With these problems in mind, it has been suggested that such cements may be marketed in the form of an elongated strip or rod which preferably is flexible enough when hard so that the strip may be wound upon a reel, as described and claimed in an application of Morris et al., Serial No. 377,162, filed August 28, 1953, for improvements in Thermoplastic Adhesive Rods or Strips. Materials in this form have been used successfully with the advantage of easy storage, a lessened danger of taking up extraneous dirt, a quicker heating of a mass sufficient for immediate use and without any danger of cooking the material to a point where it will break down and be spoiled, as disclosed in an application of W. L. MacKenzie, deceased, Serial No. 412,485, filed February 25, 1954, for improvements in Methods of and Apparatus for Dispensing and Applying Thermoplastic Adhesives. Even with these arrangements, however, there has been found to be a practical limit to the rate at which heat may be delivered to the adhesive so that the quantity desired in a progressive application to a piece of work may be secured without having to use temperatures which are excessive.

Accordingly, an object of the invention is to provide an improved cement-handling apparatus by means of which heat may fully penetrate a rod-like strip of thermoplastic material as fast as is needed.

Still another object of the invention is to provide an improved handling apparatus adapted for utilization with strips of firm thermoplastic material, in which a sufficient amount of heat is readily applied, and the quantity of such material applied to the work is readily controlled.

These objects are carried out, in the illustrated mechanism, and in accordance with features of the invention by employing a hollow heated casing within which there is journaled a disk the thickness of which is here shown as the same as the diameter of a rod of cement. This casing fits or rests against the sides of the disk and is provided with an inlet passage entering in a direction tangential to the circumference of the disk and with a passage extending around a substantial portion of the periphery of the disk and thence to an outlet. Such an arrangement enables the delivery of heat to the strip not only through the walls of the casing, as the material is carried along the passageway, but also through the periphery of the disk. Any predetermined portion of the disk picks up heat from the casing as it leaves the vicinity of the outlet and travels back to the inlet passage, in close contact with the heated casing walls and then applies it to the strip as the cold strip is introduced at the inlet opening.

Thus, the strip will be progressively squeezed and melted as it is carried around the passageway in the casing. This strip movement results partly from the frictional engagement of the disk with the sticky strip. The action of the disk to squeeze, melt and carry along the strip of adhesive is augmented in the herein illustrated arrangement by tapering the passageway which extends along the periphery of the disk so that this passageway is progressively smaller, or restricted as it approaches the outlet. As soon as the passageway is full, any attempt to push in portions of the strip faster than the melted cement passes through the outlet is prevented by a back pressure which resists the entry of the fresh strip.

This latter feature is made use of in the cement-handling apparatus by providing a strip or rod delivery mechanism which embodies a slip drive adjusted so that the back-pressure resistance causes the drive to slip. The result is that cement is fed in just as fast as it is used up, but no faster.

Still another feature of the arrangement lies in the combination of such handling and melting apparatus with a positive pump for removing melted cement at the outlet and extruding it through an associated cement-applying member, which usually will be found to be in the form of a nozzle. This too, enables an additional control to be had of the quantity of cement applied to the work by controlling the speed of rotation of the pump.

Still another feature of the invention resides in an improved progressive folding machine in which there is embodied a heating and handling apparatus such as has been outlined above.

It will be understood that the applying nozzle in a folding machine must be mounted for movement toward and away from the work so as to facilitate the introduction of a new piece of work. On the other hand it is imperative that the length of the passage from the cement melting and handling mechanism shall be as short as possible. This problem is solved, in accordance with a feature of the invention, by mounting a casing and a strip feeding mechanism upon a nozzle carrier which moves up and down with the nozzle. This permits the utilization of a passage to the nozzle which extends through rigid portions of the apparatus, thus facilitating any necessary cleaning.

Another feature of the invention resides in the interconnection of the drives for the strip-feeding mechanism and the pump or other device by means of which the melted cement is removed.

These and other features of the invention will be best understood from a consideration of the following description taken in connection with the accompanying drawings, in which Fig. 1 is a front elevation of a folding machine embodying the invention with portions of the frame cut away and in section to show the internal mechanism;

Fig. 2 is a transverse section on the line II—II of Fig. 1;

Fig. 3 is a view of the work-engaging parts of the machine, taken from the side opposite to that shown in Fig. 1 and drawn on a larger scale;

Fig. 4 is a detail view of the creaser foot which serves as a nozzle, to show its internal passages;

Fig. 5 is a section on the line V—V of Fig. 1 showing a part of the snipper mechanism and also the change-speed mechanism included in the drive for the gear pump;

Fig. 6 is a fragmentary section taken on the line VI—VI of Fig. 5 to show a portion of the manual adjustment for the change-speed mechanism;

Fig. 7 is a diagrammatic angular view of the change-speed mechanism for the pump drive;

Fig. 8 is a fragmentary view, partly in section, on a large scale taken along the axis of the drive shaft for the intermittent cement-feed pump;

Fig. 9 is a detail in transverse section on the line IX—IX of Fig. 8;

Fig. 10 is a plan view of the cement-feed mechanism shown in Fig. 3;

Fig. 11 is a section on the line XI—XI of Fig. 3;

Fig. 12 is a rear side elevation, seen from the side opposite to that shown in Fig. 1, of the nozzle carrier and the associated cement-supplying mechanism;

Fig. 13 is a front side elevation of the cement-supplying mechanism but with a portion of one side of the heat-supplying casing broken away;

Figs. 14 and 15 are detail sections on the lines XIV—XIV and XV—XV, respectively, in Fig. 13.

Figure 16:
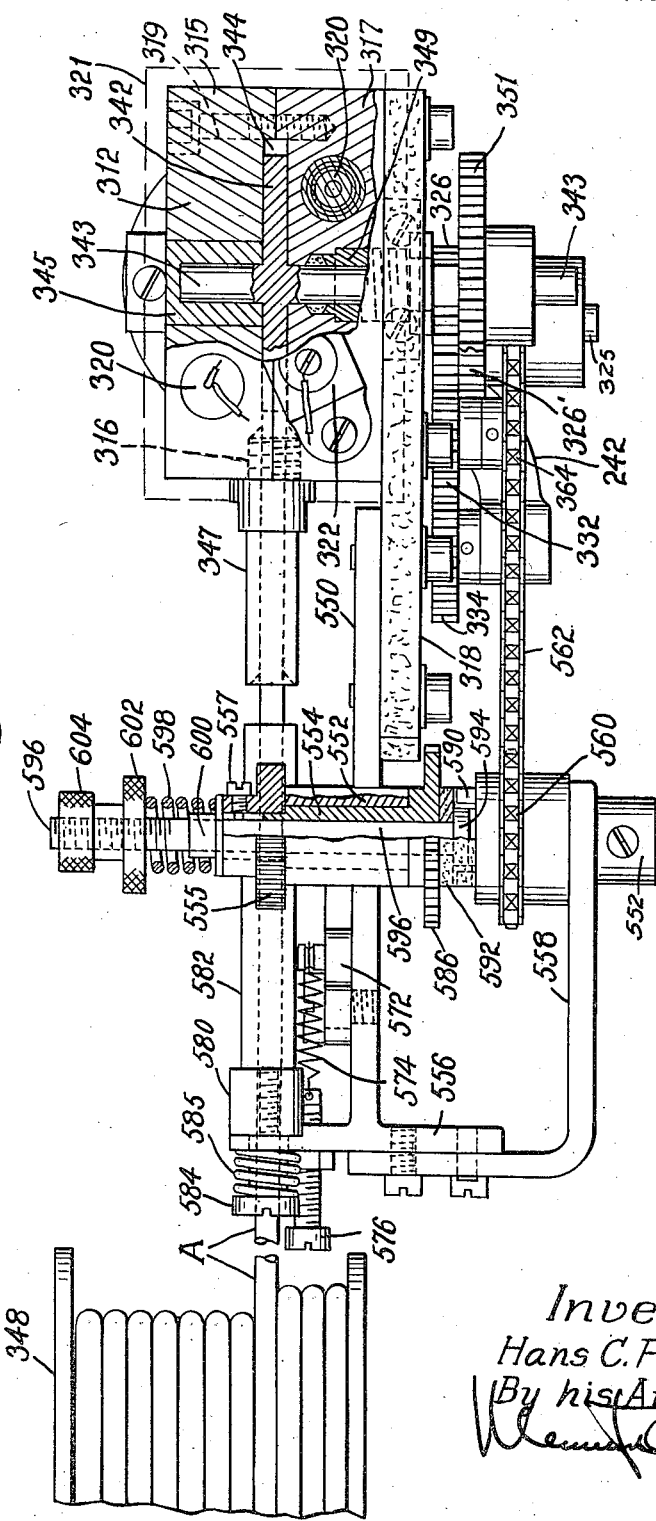
Fig. 16 is a plan view of the cement-supplying and melting mechanism with parts broken away and in section.

The frame of the machine comprises a hollow base 10 (Fig. 1) forming an oil reservoir, this base having a laterally extending arm 14. The arm 14 includes a removable end portion 16 on which is secured a work-supporting plate 18. Removably secured to the upper portion of the base 10 is a cap 19 having a neck 20 which overhangs the arm 14 and terminates in a removable head 22. The basic structure of the machine is similar to that shown in Letters Patent of the United States No. 2,270,891, granted January 27, 1942, upon the application of C. A. Newhall.

Supported on the outer end of the arm 14 is a gage block 24 (Fig. 1) having an upturned surface for deflecting upwardly the margin of the work to be folded. The extent to which the margin of the work is deflected upwardly is determined by a gage finger 28 which is mounted on the lower portion of the head 22 in a manner to be described. Since this gage finger determines the extent to which the margin of the work is deflected upwardly, it also determines the width of the fold which is to be formed therein. A folding finger 30 (Fig. 1) is mounted for oscillation in the arm 14 in a path forming an acute angle with the upper surface of the arm 14 and folds the margin of the work, which has been deflected upwardly by the gage block 24, against the adjacent surface of a creaser-foot 32. During the upward movement of the folding finger 30, the work is held against movement on the work support 18 by means of a gripper member 34 (Fig. 1) which moves from a position within the upper surface of the arm 14 to a position above this surface in which it grips the work against the under surface of the creaser-foot 32.

Located beyond the folding finger in the direction of feed of the work is a hammer 36 (Fig. 3) which cooperates with an anvil 38 to press the fold formed by the folding finger 30. After the fold has been pressed between the hammer and anvil, the gripper member 34 moves downwardly to release its hold on the work and the hammer and anvil then move as a unit toward the observer in Fig. 3 to feed the work past the gage block 24. The work is accordingly folded and fed in a step-by-step manner generally as described in the aforementioned Newhall patent.

A snipper knife 40 (Fig. 1) is mounted on the head 22 and is arranged to be moved downwardly under the control of the operator for snipping the margin of the work when a sharp incurved portion thereof is being folded. This snipper knife moves in an upright plane between the gage block 24 and the folding finger 30 and the adjacent surface of the gage block is formed as a shearing surface with which the knife cooperates when moved downwardly to snip the margin of the work. The mountings and operating mechanisms for the various folding instrumentalities will now be described in detail.

A main drive shaft 42 (Fig. 1) is journaled in the base 10 and the arm 14 of the machine and is provided at its right end with a pulley 44 by which it may be connected by a belt 46 to any suitable driving means. The work gripper member 34 is mounted on the outer end of a rockshaft 48 journaled in the arm 14 and extending parallel to the main drive shaft 42. A release arm 50 (Figs. 1 and 2) is secured to the inner end of the shaft 48 and forms means by which the shaft 48 may be manually rocked by the operator to move the gripper member 34 downwardly when desired. The release arm 50 includes a downwardly extending portion 52 the lower end of which is rounded and acts as a cam follower, this portion of the arm engaging the periphery of a cam 54 mounted on the drive shaft 42. The cam 54 is integral with a collar 56 (Fig. 1) adjustably secured to the shaft 42 by means of a pinch screw 58.

A spring 60 engages a recess in the under side of the release arm 50, the lower end of the spring engaging a screw 62 threaded in the arm 14. This spring maintains the arm 52 in engagement with the cam 54 so that rotation of the cam with the shaft 42 will impart a rocking movement to the rockshaft 48 to move the gripper member 34 intermittently into and out of the upper surface of the arm 14. On the other hand, the shaft 48 may be manually moved by the operator by applying pressure to the release finger 50 when it is desired to hold the gripper member 34 in its lower position. The timing of the movements of the gripper member by the shaft 48 may be varied by adjusting the collar 56 with respect to the shaft 42.

The folding finger 30 is mounted on the inner end of an arm 64, the outer end of the arm being mounted for oscillation on a stud 66 (Fig. 3). Oscillatory movement is imparted to the arm 64 to move the folding finger by a crank pin 68 on the end of the drive shaft 42 which is received by a slotted pin 70 carried by an intermediate portion of the arm 64 so that upon rotation of the drive shaft 42 the pin 68 imparts oscillatory movement to the arm 64 carrying the folding finger.

Provision is made for adjusting the path of movement of the folding finger in order to vary the space between it and the adjacent surface of the creaser-foot by adjusting the position of the stud 66 on which the arm 64 is mounted. The stud is mounted in a bore eccentrically located in a bushing 65 journaled in the end portion 16. An arm 71 (Fig. 1) is secured to one end of this same bushing to adjust the position of the stud 66 in the end portion 16. In order to hold the bushing in the desired position of adjustment, the inner surface of the arm 71 around the margin thereof is provided with a plurality of notches with which cooperates a detent having a depressible, outwardly extending portion 72. The gripper-operating cam 54 is so adjusted on the shaft 42 that the gripper 34 holds the work against the under surface of the creaser foot 32 during the movement of the folding finger 30 to fold the margin of the work against the adjacent surface of the creaser-foot.

The anvil 38 is supported by means of a hollow shaft 80 (Figs. 2 and 3) journaled in the arm 14 and arranged to be oscillated about its axis by mechanism to be described. The anvil 38 is mounted on the outer end of an arm 82 which extends rearwardly and downwardly, as indicated in Fig. 3, the lower end thereof terminating in a split clamp 84 secured to the shaft 80 by means of a screw 86.

The hammer 36 which cooperates with the anvil 38 to press the folded margin of the work and to feed the work is formed at the upper end of an arm 94 which is pivoted between its ends on a pin 90 mounted in the arm 82, the outer end of which carries the anvil 38. Oscillatory movement is imparted to the hammer 36 to move the hammer toward and away from the anvil by a reciprocating rod 102. As the shaft 80 is oscillated, it will cause oscillation of the anvil 38 and, by reason of the mounting of the hammer, a similar motion will be imparted thereto so that the hammer and anvil are moved together along the line of feed. During this movement of the hammer and anvil, the hammer is adjacent to the anvil with a portion of the fold in the margin of the work pressed and held therebetween.

The mechanism by which the hammer is moved toward and away from the anvil will now be described. The hammer-carrying arm 94 (Fig. 3) is bifurcated at its lower end to embrace opposite sides of a block 104 mounted on the rod 102. Pins 106 pass through alined apertures in the arm 94 and pivotally connect the arm to the block 104 for movement therewith. The block 104 is maintained against a stop 108 carried by the rod 102 by a spring 110, the outer end of which bears against a nut 112 threaded on the outer end of the rod 102. The inner end of the spring 110 bears against the block 104, so that the hammer will be oscillated about the pin 90 as the rod 102 is reciprocated. The spring 110 forms a yielding connection between the arm 94 and the reciprocating rod to permit relative movement between these members to soften the blow of the hammer against the work.

In order to cause reciprocation of the rod 102 within the hollow shaft 80 to move the hammer 36 toward the anvil, the shaft 42 is provided with an eccentric surrounded by a strap 132 (Fig. 1) from which depends a pitman 134 pivotally secured at its lower end to a lever 136. This lever is journaled on a stud 138 supported in the base 10 of the machine and the opposite end of the lever is connected by a link 140 to the lower end of a lever 142. This lever is journaled on a stud 144 mounted in the base of the machine and the upper end of this lever is connected to the inner end of the reciprocable rod 102. As the shaft 42 rotates, the rod 102 will be reciprocated in time relationship with the folding finger 30 and the gripper member 34 which are also driven from the shaft 42.

The hollow shaft 80 which is oscillated to impart feeding movements to the hammer and anvil is also connected to the shaft 42. For this purpose an eccentric (not shown) is mounted on the shaft 42 and is surrounded by a strap 152 (Fig. 1) having a depending arm 153 the lower end of which is pivotally connected to a lever 154. This lever is journaled on a stud 156 mounted in the base of the machine. The opposite end of the lever 154 is connected to a link 160 by means of a pin (not shown) traversing the forked upper end of said link. The opposite end of the link 160 is also forked, as indicated in Fig. 1, and is connected by means of a pin 162 to the upper end of an arm 164. The pin 162 also carries the lower end of a link 166 pivotally connected at its upper end to an arm 168 secured to the hollow shaft 80 which supports the anvil for oscillation.

The arm 164 forms with the link 166 a toggle through which oscillation is imparted to the shaft 80 as the pin 162 connecting the arm 164 and the link 166 is moved more or less out of alinement with the opposite ends of the arm and link respectively upon rotation of the shaft 42. The lower end of the arm 164 is supported by a pin 170 which is in turn supported by an arm 172 fixed to a feed-control shaft 174 (Figs. 1 and 5) journaled in a hollow bearing sleeve 176 in the base of the machine. Upon turning the shaft 174, the arm 172 is swung about the axis of the shaft, thus moving the pin 170 on which the arm 164 is supported so as to cause the pin 162 connecting the arms of the toggle to lie more or less in alinement with the ends of the toggle arms whereby the amount of oscillation of the shaft 80 for a given movement of the link 160 may be varied. Thus the amount of feeding movement of the hammer and anvil will also be varied.

The feed-control shaft 174 extends outwardly from the base of the machine and is connected by an arm 180 (Fig. 5) to a rod 182 suitably connected to a treadle. This arm is urged upwardly by any suitable means, such as a spring (not shown), and the extent of upward movement is limited by the engagement of an arm 184, rigid with the shaft 174, with an adjustable stop 186 threaded through a bracket 188 fixed to the base of the machine. When the arm 180 is in this upper position, the pin 170 is in its normal operating position thereof. If a longer feeding movement of the hammer and anvil is desired, the shaft 174 is moved in a counterclockwise direction, as viewed in Fig. 5, to the position shown there, by downward movement of the treadle rod 182 so as to carry the pin 170 more out of alinement with the pin 162 and the upper end of the link 166 of the toggle. Movement of the shaft 174 in this direction is limited by the engagement of the arm 184 with a stop peg 190 received by one of several holes in the lower portion of the bracket 188. The position of this stop peg may be varied adjustably to limit the maximum work-feeding movements of the hammer and anvil.

It will be noted that the mechanism for operating the reciprocable rod 102 for causing movement of the hammer toward and away from the anvil and that for oscillating the shaft 80 for imparting feeding movements to the hammer and anvil are entirely enclosed by the base 10 and the cap 19 with its neck 20 forms a cover therefor. The base may therefore be filled with oil to maintain the various operating parts and connections properly lubricated whereas the various adjustments heretofore described are all located so as to be accessible exteriorly of the casing, thus simplifying the various adjustments that may be desired during the operation of the machine.

Having described the work-contacting tools which are supported in the lower arm 14 of the frame, it is in order to describe those coacting tools which are supported in the removable head 22 attached to the neck 20 of the frame. This removable head 22, the attaching portion of which is shown in section in Fig. 1, comprises a casting which has a side plate 200 (Fig. 11) erected on the side toward the observer in Fig. 1 and from the lower edge of this side plate the casting is extended away from the observer to provide an underlying portion 202 which includes a transverse web 204 and which extends upwardly again (as seen in Fig. 3) terminating in a triangular plate 206.

Integral with the web 204 is a depending member 208 (Fig. 3) passing through which is a pivot rod 212. On this pivot rod 212 are mounted the gage finger 28 and its finger piece 214. The latter is normally held upward by a spring 216 (Fig. 1) but the arrangement is such that the finger piece may be depressed by the operator to lift the gage finger when inserting a piece of work to allow the skived margin of the work to be slipped into the space between the gage finger and the gage block 24. The finger piece 214 has a recess which receives a slotted end 215 of the gage finger, thus providing for the front to back adjustment of the gage finger with respect to the gage block so as to accommodate different thicknesses of work.

Also mounted on this underlying portion 202 is the snipper knife 40 (Fig. 1) which is adjustably secured by a screw 218 to a bell-crank supporting lever 220 having a hub which is carried between pivot screws 222 and 224 (Fig. 3). The first of these screws is threaded in the lower portion of the side plate 200 while the other screw is threaded in a lug 226 forming an integral extension of the web 204. To prevent the moving work from springing the supporting lever 220 for the snipper knife 40, the depending member 208 has a further extension 228 in which there is threaded a screw having a head 230 against which the face of the snipper knife 40 rests. It will be clear that, by means of the screws 222 and 224, the plane of movement of the snipper knife may be adjusted to bring it close to the far face of the gage block 24, as seen in Fig. 1, it being remembered that the knife cooperates with this block to provide a shearing action as cuts are made in the skived margin which is turned up from the body of the work between the gage finger 28 and the gage block 24. Attached to the upper arm 219 of the bell-crank lever 220 is a rod 232 to which a reciprocating movement may be imparted at the will of the operator by a mechanism to be later described.

The creaser-foot is attached by screws 234, 236 (Fig. 4) to the lower end of a nozzle carrier 240 having a passage 241 (Fig. 3) connecting a hollow element-melting casing 312 (to be described) to a passage 300 in the creaser-foot 32 which enables the latter to act also as a nozzle. This inclined nozzle carrier 240 is movably supported, as later described, on a substantially horizontal carrier plate 242 (Figs. 3 and 11) overlying the web 204 of the head casting 22. The carrier plate is supported in the head 22 by means of screws 244, 246, 248 (Fig. 11) which are received in grooves as at 250 in the side edges of this carrier plate. This allows adjustment horizontally of the supported creaser-foot 32 with respect to the folding finger 30 and by turning in and out the screws 246, 248 permits the lateral position of the carrier plate 242 to be determined so that said foot will clear the anvil 38. A front to back adjustment of the plate, endwise of the head, is accurately effected by providing a groove 243 (Fig. 3) in the bottom of the carrier plate to receive a cylindrical piece 252 (Fig. 11) eccentrically mounted on a pin 254 and secured thereto by means of a setscrew 256. The pin 254 is frictionally held against rotation by a tight fit in the lower part of the triangular portion 206, shown in Fig. 3, and at its other end in the side plate 200.

At its front end the carrier plate 242 has an extension 260 (Fig. 11) to furnish a mounting for a pivot 261 (Fig. 12) at one end of a supporting link 262 (Fig. 12) which has a pivot screw 265 joining it to a hump 267 on the nozzle carrier 240. At its other end the carrier plate 242 has spaced lugs 264, 266 (Fig. 11) to provide a tiltable mounting for the upper portion of the nozzle carrier 240.

Specifically, this mounting comprises a U-shaped yoke 270 (Fig. 10) pivoted upon a shaft 272 passing through the lugs 264, 266. This yoke has forwardly extending arms 274 to receive a pivot pin 276 passing through a hump 278 (Fig. 3) on the lower side of the nozzle carrier. Upward movement of the creaser-foot and the nozzle carrier about the shaft 272 and the link pivot 261 may be effected by the depression of a finger piece 280 (Figs. 1 and 12) attached to the outer end of a cross rod 282 on which an arm 284 (Fig. 12) is secured. This arm has at its outer end a roller 286 positioned to underlie the link 262. The lifting action is effected against the action of a spring 288 (Fig. 12) surrounding a rod 290, a lower end of which is pivotally attached to the link 262 at 292. The rod passes through a plate 294 having a pivot extension 296 which rocks in an upstanding arm 298 forming part of the carrier plate 242. Threaded in the plate 294 is a bushing 297 to adjust the tension of the spring 288 and on the rod is a locknut 299.

It will be noted that the connecting passages 300 in the creaser-foot 32 (shown in Fig. 4) join the passage 241 in the nozzle carrier 240 to the bottom surface 302 of the creaser-foot. The latter is provided with a lateral hollow extension 304 for the reception of a heating unit designed to maintain the temperature of the creaser-foot at a desired value.

Furthermore, within the passage 241 in the nozzle carrier 240 there is a heating unit 306 (Figs. 3 and 13) supported at its upper end in a bushing 308 threaded in the carrier 240. The upper end of this unit is provided with terminals 310 supported on a bracket 311 and to which electric conductors may be attached and led to any suitable control device whereby the temperature of the passage surrounding this heating unit 306 may be maintained at its desired value.

Coating material is supplied to the passage 241 in carrier 240 from a casing 312 which is positioned against a shoulder 314 (Fig. 13) in a bulge integral with the carrier 240 and is secured thereto. This casing has an inlet 316 to which a strip or rod of thermoplastic cement A is fed by an impositive feed mechanism, to be described, which is attached to a plate 318 (Fig. 16) of heat insulating material such as Textolite mounted on the casing. This casing is maintained at a predetermined temperature of about 300° F. by means of heating units 320 under the control of an adjustable thermostat 322 and is covered with insulation 321.

At the bottom of this casing 312 is an outlet 313 merging into a space containing the gears 324 of a pump 323, said gears (Figs. 3 and 10) being mounted on laterally extending shafts 325, 327. The shaft 325 is provided with a driving pinion 326. It will be seen from Fig. 3 that the gear pump feeds into an outlet passage 330 which opens directly into the passage 241 of the carrier and hence ultimately to the creaser-foot nozzle 32 (Fig. 4). The pinion 326 which is attached to the pump gear 324 meshes with an idler 332 to which power is transmitted by a gear 334 carried by the shaft 272 about which the yoke 270 swings and on this shaft between the arms of the yoke is a skew gear 336 (Fig. 10) meshing in turn with another gear 338 on a shaft 340 extending lengthwise of the frame arm 20 and to which power may be delivered intermittently by a mechanism to be later described.

The maintenance of an adequate supply of melted cement at the outlet 313 at the bottom of the casing 312 for removal by the gear pump 323 (Fig. 10) involves changing the solid cement to a liquid within a reasonable space and without the utilization of excessive temperatures. To this end, the hollow casing 312 is formed of blocks 315, 317 held together by screws 319 and recessed on their meeting faces to provide a chamber designed to receive a driven cylinder or disk 342 substantially as wide as the rod cement and having a diameter several times as great. This disk has a shaft 343 (Fig. 16) which is journaled in a drive-fit cup bearing 345 and in a gland 349. This shaft has an integral gear 351 meshing with a pinion 326' (Fig. 16) on the pump shaft 325 which pinion is the same size as and turns with the pinion 326 in the side of the casing. The side faces of the chamber in the casing fit snugly (Figs. 14, 15 and 16) against the disk so that heat is transmitted readily from the casing to the disk by conduction. The periphery of the chamber is defined by a curved wall which is opposite to the periphery of the disk and is spaced therefrom near the inlet 316 sufficiently to admit a solid strip or rod A. The curvature of this wall is such, with respect to the periphery of the disk, that successive portions are differently spaced from successive points upon the disk thereby to form a tapered passage. The curved wall approaches close to the disk near the outlet 313. Thus, as the rod is progressively carried along by the disk, it is squeezed and melted by the action of the driven disk which derives heat from the casing and transfers this heat to the rod and is effective over a longer arc as the cement melts, due to the taper of the passage, than would be the case if the passage were of uniform height radially of the disk. The disk is driven at a peripheral speed faster than the speed of movement of the cement.

Accordingly, around a considerable portion of the periphery of the disk, here about 180°, a rectangular passage 344 (Fig. 13) has been provided for the travel of adhesive from the inlet 316 to the space just above the gear pump 323. This passage, which is as wide as the disk is thick, and which has its size determined by the size of the rod employed, connects with the inlet 316 through a straight inlet passage 346 which is round and is tangential to the disk as shown in Fig. 14. An inlet tube 347 projects from the casing to permit heat received by conduction from the casing to be partially removed by convection to the ambient air which will be at room temperature. From the top of the disk in the illustrated form to the bottom thereof just above the gear pump the rectangular passage 344 tapers to a gap of approximately 0.009 of an inch, thus requiring the rod A to be thoroughly melted before it is delivered to the pump. It will be noted that the whole of the right-hand portion of the disk, as seen in Fig. 13, is receiving heat, from the casing, which heat it delivers to the adhesive along the other half of the periphery of the disk and this introduction of heat from a moving member which is continually being reheated as it travels through the closely fitting casing surrounding the right-hand half of the disk greatly speeds up the melting process without the need of high temperatures. At the same time a back pressure is set up which effectively limits the admission of the adhesive to the inlet 316 under the impulse of the impositive drive for the rod feed which is to be described. The friction between the periphery of the disk and the partially melted tacky cement is sufficient of itself to pull a cool, solid rod from a supply reel 348 into the casing and the disk is also effective to stir and mix the cement ingredients. Increasing the speed of the disk increases the temperature and the speed may be made high enough to supply all the heat.

The impositive cement-rod feed mechanism, which operates to push the rod into the casing to fill the passage and hence against the back pressure provided by molten cement filling the tapered passage 344, is mounted upon a bracket 550 attached to the plate 318 (Fig. 16). This bracket has an upwardly extending portion providing a bearing 552 for a sleeve 554 which carries an upper corrugated feed roll 555 and has on its outer end a T-shaped portion 556 one-half of which carries a bent arm 558 providing a bearing for a sprocket 560 connected by means of a chain 562 to a sprocket 564 which is mounted on and secured to the shaft 325 of the gear pump 323. The bracket 550 has a depending portion 551 (Fig. 13) in which there is mounted a pivot screw 566 carrying a bell crank lever 568 the short arm of which supports a lower corrugated feed roll 570.

The other arm of the bell crank provides a handle 572 enabling the lower feed roll to be manually displaced when it is desired to insert a new rod A of cement, this being done against the tension of a spring 574 extending from the lever to an adjusting screw 576 mounted in the T-portion 556. The T-portion also serves to support a block 580, in the lower portion of which is mounted a tubular guide 582 for the incoming rod A. This tube extends beyond the grooved corrugated feed rolls but is cut away to receive them at top and bottom. In order that this may be readily swung aside for cleaning, the block 580 is held yieldably against a shoulder of the bracket by a shoulder screw 584 which is loose in the bracket and is held in place by a spring 585 between the head of the screw and the bracket.

It will be understood that the inlet tube 347 which is in alinement with the tangential passage 346 absorbs heat from the casing which in practice is maintained at a temperature of 300° F. On the other hand, this inlet tube is air cooled and by properly designing the thickness of the tube and its length it will be kept at a temperature varying from 185° when the machine is running to perhaps 210° when the machine has been stopped between the presentation of pieces of work. It is found to be important in regular use that this tube shall be warm enough so that the material within it slides readily in response to the drag of the disk or the pressure of the impositive cement rod feed mechanism but it must not be so hot that there is any substantial drooling at its entrance.

The entrance is widened slightly as indicated in Fig. 13 for convenience in entering the rod into the apparatus and in order still further to prevent heating the rod as it enters the tube. If the temperature in this tube becomes too high the melting of the cement rod will increase to a point where there will be substantial drooling at its entrance. As designed, there is no appreciable drooling and if any slight doughnut-shaped accumulation of adhesive occurs when the machine is not running, this will readily be carried back gradually, frictionally into the tube and thence into the casing by the cold rod. It is the relatively low temperature of the rod taken from the supply reel 348 and the absorption of heat, in the tube, by the rod as it is fed into the casing which lowers the temperature of the tube from 210° to 185° as the rod moves along the tube.

The sleeve 554 supporting the upper feed roll 555 has integral with its headed end a gear 586 which meshes with a gear 588 on the lower feed roll so that they are driven in synchronism but in opposite senses of rotation.

An impositive or slip drive for these feed rolls comprises a pair of prongs 590 upon the hub of the sprocket 560. These are received in corresponding notches in a ring 592 which rests against the side face of the gear 586 and is held more or less firmly thereagainst by the head 594 of a rod 596 which extends through the sleeve 554 and is drawn inwardly by a spring 598 surrounding the rod and bearing at one end against a collar 600 which rests against the hub of the feed roll 555. At its other end the spring 598 rests against a nut 602 threaded on the rod 596 and held in adjusted position by a locknut 604. It will be noted that adjustment of the compression of the spring 598 does not introduce any friction against the ends of the bearing 552 since the feed roll 555 is locked to the sleeve 554 by a setscrew 557 in such a position that there is no undue friction between the head of the sleeve and the bearing or between the feed roll and the bearing. When there is a resistance to the forward movement of the rod A, the driven ring 592 slips on the end face of the gear 586.

Mechanism for the oscillation of the snipper knife 40 comprises a rod 360 (Fig. 1) connected to the rod 232 by means of a turnbuckle 362. The rod 360 passes through a partition 364, between the cap 19 and the neck 20, which completes the oil chamber. The rear end of the rod 360 is pivotally connected to an arm 370 rockable on the shank of a screw 372 (Fig. 5) supported by a boss 374 carried by the cap 19 of the frame of the machine. The arm 370 includes a downward extension block below the screw 372, the lower portion of the block having spaced arms between which is pivotally mounted a latch substantially as shown in the above-mentioned Newhall Patent No. 2,270,891.

This latch is spring-biased downwardly to a position in which it is located between a pair of spaced arms which extend laterally from an arm 384 (Fig. 5) journaled on a pin 386 secured to the upper end of a bracket 388 extending from the base of the machine up into the cap 19. The arm 384 is arranged to be oscillated about the pin 386 by the drive shaft 42. To this end the drive shaft carries an eccentric surrounded by a strap 392 which has a pitman 394 pivotally connected to an arm 396 (Fig. 1) integral with the arm 384. Thus, a rocking motion is imparted to the arm 384 upon rotation of the shaft 42 and, when the latch is in its down position between the extensions of the arm 384, a similar motion will be imparted to the arm 370 to which the rear end of the rod 360 is connected, causing reciprocation of the rod 360 against a return spring 368 interposed between flanged collars 366 and oscillation of the snipper knife to snip the margin of the work.

The snipper-operating latch is normally maintained in the up position by a lever 399 (Fig. 1) pivoted on a screw 402 threaded in a boss 403 (Fig. 5) attached to the cap 19 of the machine, in which position the latch is out of engagement with the extensions of the arm 384. The forward end 400 of the lever engages an extension of the latch and moves the latch upwardly under the influence of a spring-pressed plunger 406 (Fig. 1) engaging the rear end 401 of the lever 399. A stop pin 408 (Fig. 1) located below the rear end 401 of the lever limits the extent of movement thereof by the plunger 406.

In order to move the lever 399 against the force of the plunger 406 to permit downward movement of the latch, a rod 410 vertically movable in a frame bearing 412 engages the under side of the lever arm 401 opposite the plunger 406. This rod 410 may be connected to a treadle mechanism (not shown) by means of which an upward movement may be imported thereto by the operator whenever operation of the snipper knife is desired. The connection between the knife and the shaft 42 formed by the latch is such that the upper part of the casing comprising the neck 20 and the cap 19 may be readily removed from the base of the machine whenever desired.

An intermittent drive for the cement pump is actuated by means of an eccentric 420 (Figs. 1 and 7) on the drive shaft 42. This eccentric imparts an oscillatory movement to a forked lever 422 pivoted at 423 and having an arm 424 (Fig. 7) joined by means of links 426 and 428 to a lever 430 which is loose on a sleeve 432 surrounding the shaft 340 and is adapted to be connected to said sleeve to give an intermittent movement thereto in a clockwise direction, as viewed in Fig. 7.

To that end, a latch 440, pivoted at 442 in a lever 438 gripping the sleeve 432, is shaped to fit in a notch 444 at the top of the lever 430 and when it snaps into that notch, under the action of a spring 448, connects the lever to the sleeve 432 to oscillate the sleeve and drive the pump. The shock resulting from thus connecting a moving part to a still part is softened by a buffer spring 434 and a follower spring 436 acting on opposite ends of the lever 438. These springs, as may be seen in Fig. 5, surround rods slidable in bushings secured to the cap 19. The latch 440 has a depending tail piece 446 which is normally urged away from the end of the shaft 340 by means of the interposed spring 448. The latch 440 and its tail piece 446 may, however, be rotated against the spring 448 by the depression of a rod 450 so as to lift the latch out of the notch 444 and stop the pump.

This depression of the rod 450 is effected by a lever 452 (Fig. 5) pivoted on a bracket 454, whenever a solenoid 456 is deenergized by an operator-controlled switch (not shown) so that its core is released from the solenoid and is raised by a spring 455. The bracket 454 is a part of a plate 458 which is clamped on the outside of the cap 19.

It is desirable to vary the amount of cement extruded during each oscillation of the sleeve 432, and eventually of the shaft 340, in accordance with the lengths of the work-feeding steps so that, irrespective of the rate of feed of the work, the quantity of cement delivered thereto will be uniform. For this purpose the arm 172, which is adjusted by the operator to vary the rate of feed, is utilized also for adjusting the extent of oscillation of the sleeve 432.

The links 426 and 428 are connected by a pin 460 to which is also connected the arms of a twin lever 462 (Fig. 6) carried by a fulcrum pin 464 extending outwardly from an end of an arm 466. A swinging of this arm varies the center about which the links-connecting pin 460 moves when the arm 424 is oscillated by the drive shaft 42. Consequently the extent of swinging movement imported to the sleeve 432 by the eccentric 420 depends upon the position of the fulcrum pin 464.

The arm 466 (Fig. 7) is secured to one end of a rod 470 which is in turn adjustably secured, as will be described, to a sleeve 484 carrying an arm 472 which is connected by an adjustable link 474, 478 to the arm 172. The two parts of the link 474, 478 are clamped together in adjusted relation by a screw 480. From the above it will be seen that upon swinging the arm 172 to adjust the lengths of the feeding steps of the work, arms 472, 466 will swing, thus varying the position of the fulcrum pin 464 and consequently varying the extent of the oscillatory movement imported by the drive shaft 42 to the sleeve 432 and the shaft 340.

It may also be desirable to effect an independent adjustment of the rate of feed of cement to accommodate work pieces of different characteristics requiring a greater or lesser amount of cement to hold the margin in folded condition. For this purpose provision is made for relatively moving the rod 470 and the sleeve 484 to vary the angular relationship between the arms 466 and 472, the effect of which is to adjust the position in space of the fulcrum pin 464. The rod 470 carries a segment 482 provided with a series of spaced notches 490 arranged to be engaged by a spring-pressed latch 488 carried by an arm 486 secured to the sleeve 484. By retracting the latch 488 the sleeve 484 may be moved relatively to the rod 470 and the parts locked in the desired relative positions by engagement of the latch 488 with the appropriate notch 490. Since these parts are outside of the partition 364 it is possible to make this adjustment during the operation of the machine.

The mechanism for importing the oscillations of the sleeve 432 to the gear 338 is illustrated in Fig. 8 where it will be seen that the sleeve 432 has a bearing 492 in the partition 364 between the cap 19 and the neck 20. The left end of the sleeve, as shown in Fig. 8, terminates in a Horton clutch comprising an annular cup 494, a rotor 496 and the usual spring-pressed rolls (not shown) whereby the rotor and ultimately the gear 338 which drives the cement pump gears 324 is driven intermittently in one direction as the sleeve 432 is oscillated. This rotor 496 is connected to a similar rotor 498 constituting part of a one-way brake of the Horton type which prevents retrograde movement of the gear during back strokes of the sleeve. The rotor 498 cooperates through rolls 499 (Fig. 9) with a cage 500 held against rotation by a pin 502, which, as may be seen in Fig. 1, is mounted on the partition 364 and is received between two lips 504 extending outwardly from the cage 500. These rotors, separated by a washer 501, are joined by pins 506 to one another and to a cup 508 within which there is a protective friction clutch joining it to the shaft 340. If the operator should start the pump drive, by energizing the solenoid 456, before the cement has melted sufficiently, the breakage of parts will be avoided by this protective clutch.

The friction clutch just described includes a sleeve 510 which surrounds the shaft 340 and at the right end of which there is a flange 512 resting against a friction plate 514 which is keyed to the cup at 516. At the left of the plate 514 is a ring 518 keyed to the sleeve 510 at 520. This ring is continually urged against the side of the plate 514 by means of a spring 522, the outer end of which is held in adjusted compression by nuts 524 threaded on said sleeve. The end of the latter is notched to receive prongs 526 on a spacer 528 between the sleeve and an end web 530 (Fig. 1) of the neck 20. The spacer 528 is pinned to the shaft 340. Thus, while retrograde movement of the shaft is prevented by the one-way brake 498, 500, the oscillations imparted to the sleeve 432 are carried through the clutch 494, 496 and the protective friction clutch to give the driving gear 338 an intermittent turning movement in one direction. The shaft 340 adjacent to the gear 338 is journaled in the web 530 on the neck 20.

When the machine is to be operated, assuming that a cement rod has been threaded through the feed rolls and thence to the casing, the operator will turn on the electrical heat for the units 320 (Fig. 12) in the casing 312 and for the unit 306 in the nozzle carrier and for the unit 304 on the side of the creaser-foot nozzle. As soon as this heat melts any residue in the nozzle and the rod in the casing, a switch, such as a knee-operated switch, may be closed to energize the solenoid 456, thereby to complete the drive for the pump by allowing the latch 440 to be closed by its spring 448 (Fig. 7).

A piece of work, having a skived edge, may be inserted in the machine in the usual fashion by depressing the finger pieces 214 and 280 so as to lift the gage finger and the creaser-foot, whereupon the work may be moved against the gage block 24 and the finger pieces released. During this lifting movement, the idler 332 will roll around the gear 334 without interfering with the drive and if seams are encountered, the creaser foot and nozzle 32 will ride over them without difficulty. Having then started the drive leading to the main shaft 42 of the machine to fold and feed the work, cement will be supplied continuously through the creaser-foot at a point just prior to the folding of the margin of the work. The cement cools so quickly that, as soon as the folded margin is pressed against the margin of the work by the hammer 36, enough heat will have been removed by the leather to allow the cement to cool and to hold the fold in the work.

If, during the operation of the machine, the portions of the work to be treated are practically straight, then the treadle connected to the rod 182 will be depressed thereby increasing the rate of feed of the work by the hammer and anvil mechanism. This will be effective at the same time, by reason of the mechanism, including the vertical link 474 in Fig. 7, to increase the arc of oscillation of the drive gear 338 and thus will increase the amount of cement which is delivered to the work, to the end that the same amount of cement may be applied to each unit of the margin. If the character of the work requires it, more or less cement may be delivered by adjusting the latch 488 with respect to the segment 482 and this may be done without stopping the operation of the machine. It will be understood also that the snipping mechanism may be operated during curved portions of the work by raising the rod 410 so as to drop the latch 378 to complete the drive for the snipper knife. The action of the impositive drive for the rod feed rolls 555 and 570 will serve to supply cement to the casing 312 as fast as it is removed by the gear pump 323.

Having thus described my invention, what I claim as new and desire to secure by Letters Patent of the United States is:

1. A cement handling apparatus comprising a heated hollow casing having an inlet and an outlet, means movable within the casing to carry thermoplastic cement from said inlet to said outlet, means for feeding a rod of solid thermoplastic cement to the inlet, and an inlet tube forming a closed passageway for the rod to guide it to the inlet, said tube having an outer surface area exposed to the room air which area is large enough to prevent an excessive rise in the temperature of the entrance end of said tube in spite of the conduction of the heat in the casing to the inlet tube.

2. Apparatus for handling cement in rod form comprising a heated hollow casing having an inlet and an outlet, a disk journaled in the casing, said casing having a narrow passage extending along the periphery of the disk to join said inlet to said outlet, an inlet tube in conductive relation to said heated casing for surrounding and leading a rod into the inlet, said tube extending outwardly from the casing with its outer surface exposed to the air, means spaced from the casing for feeding a rod of solid thermoplastic cement to the inlet tube, said feeding means comprising a guide tube the exit end of which is spaced from the entrance end of the inlet tube.

3. A cement handling apparatus comprising a heated hollow casing having a thin disk journaled therein with its side faces in close relation to the casing, the latter having an inlet passage which is substantially tangential to the periphery of the disk, a passage in the casing extending around a major portion of the periphery of the disk, the casing having an outlet communicating with the passage, said passage being progressively smaller toward the outlet, and means for driving said disk to stir up, feed and melt the cement as it is progressively heated and to deliver it to the outlet.

4. A cement handling apparatus comprising a heated hollow casing within which there is journaled a disk heated by contact with the casing, said casing having an inlet and a passage extending therefrom along the periphery of the disk and having an outlet, the cross section of the passage being progressively restricted as it approaches the outlet, means for rotating the disk and means for feeding a strip of solid thermoplastic cement to the inlet for progressive carriage, squeezing and melting, as the disk is rotated, through this passage to the outlet thereby allowing the melting of the cement by the heat of the casing and of the disk as the strip is dragged through the casing.

5. In a folding machine, a nozzle through which cement may be extruded upon the work, movably mounted carrier means supporting said nozzle for lifting movement to facilitate the introduction and passage of work having seams, a hollow casing mounted on said nozzle carrier for movement therewith, means for heating said casing, said casing being provided with an inlet and an outlet, a driven disk within the casing for assisting in melting thermoplastic cement in the form of a rod received through said inlet and transferring it toward the outlet, and means for driving said disk operative irrespective of the position of the nozzle carrier.

6. In a machine of the character described, a nozzle, driven means for supplying cement to the nozzle, a driven work-feeding mechanism, a common control for varying the effectiveness of said driven devices, said cement-supplying means comprising a hollow heated casing, a cement-feeding disk rotatably mounted in said casing, a passage connecting the casing to the nozzle, and a driven delivering mechanism supplying solid thermoplastic cement in elongated form to the interior of the casing, said delivering mechanism and said disk being interconnected for movement in a predetermined relation.

7. In a cement-handling apparatus, a nozzle for delivering cement to the work, a support for a quantity of solid thermoplastic cement in the form of a continuous strip, a hollow casing heated to melt the cement, feed rolls between the support and the casing for engagement with the strip of cement, said apparatus having a passageway between the casing and the nozzle, driven means in the casing for delivering the melted cement to the nozzle, and a drive for the strip engaging feed rolls driven in synchronism with the cement-delivering means within the casing.

8. In a folding machine, a nozzle carrier, a nozzle on said carrier, a hollow heated casing on the nozzle carrier communicating with the nozzle, said heated casing being provided with an inlet and with a tapered passage joining said inlet and the communication to the nozzle, and a slip-drive feed-mechanism for delivering solid elongated thermoplastic cement in strip form in a straight line, to the inlet of the casing whereby said drive will slip when the back pressure in the casing prohibits the delivery of additional cement thereto.

9. Apparatus for handling cement in strip form comprising a hollow, heated casing having an inlet and an outlet, said casing comprising blocks which are separable, at least one block being recessed to provide an internal chamber connected to the inlet and the outlet within the casing, a disk in said chamber journaled therein and having its side faces in heat conductive relation with the side walls of the chamber whereby the heat of the casing is transferred to the disk, the periphery of said chamber being defined by a curved wall which is opposite to the periphery of the disk and is spaced from the disk near the inlet to provide for the admission of a solid strip of cement from the inlet, said curved wall approaching closer to the periphery of the disk near the outlet thereby furnishing a melting passage through which the cement is dragged by the disk, the width of said passage being substantially the same as the thickness of the disk, means for feeding a strip of solid thermoplastic cement to the inlet, and means for rotating the disk to deliver to the outlet, cement which is melted by contact with the casing and the disk.

10. A cement handling apparatus comprising a heated hollow casing having a thin disk journaled therein with its side faces and a portion of its periphery in close heat conductive relation to the casing, the latter having an inlet which is substantially tangential to the periphery of the disk, a passage in the casing extending around a major portion of the periphery of the disk, the casing having an outlet communicating with the passage, means for feeding a solid strip of thermoplastic cement into said passage through said inlet, and means for driving said disk to stir up, feed, and melt the cement as it is progressively heated and to deliver the melted cement directly to the outlet.

11. Apparatus for handling cement in solid strip form comprising a hollow casing having a rotatable disk journaled therein and shaped to provide a passage extending along the periphery of said rotatable disk, said casing also having an inlet substantially tangential to the periphery of the disk and in communication with one end of said passage and an outlet in communication with the other end of said passage, means for heating said casing and said rotatable disk, means for feeding a solid strip of thermoplastic cement into said passage through said inlet, and means for driving said rotatable disk to stir up, feed and melt the cement as it is progressively heated and to deliver the melted cement directly to the outlet.

12. Apparatus for handling cement in solid strip form comprising a hollow casing having a rotatable disk journaled therein and shaped to provide a passage extending along the periphery of said rotatable disk, said casing also having an inlet substantially tangential to the periphery of the disk and in communication with one end of said passage and an outlet in communication with the other end of said passage, said passage being progressively smaller toward the outlet, means for heating said casing and said rotatable disk, means for feeding a solid strip of thermoplastic cement into said passage through said inlet, and means for driving said rotatable disk to cause it to stir up, feed and melt the cement as it is progressively heated and to deliver the melted cement directly to the outlet.

13. A cement handling apparatus comprising a heated hollow casing having a thin disk journaled therein with its side faces and a portion of its periphery in close heat conductive relation to the casing, the latter having an inlet which is substantially tangential to the periphery of the disk, a passage in the casing extending around a major portion of the periphery of the disk, the casing having an outlet communicating with the passage, said passage being progressively smaller toward the outlet, means for driving said disk to stir up, feed and melt the cement as it is progressively heated and to deliver the melted cement directly to the outlet, means for applying the melted cement to a work piece, and a pump for delivering the melted cement from said outlet to said applying means.

14. Apparatus for handling cement in solid strip form comprising a hollow, heated casing having an inlet and an outlet, said casing including blocks which are separable, at least one block being recessed to provide an internal chamber connected to the inlet and the outlet within the casing, a disk in the chamber journaled in the casing and having its opposite side faces and a portion of its periphery in heat conductive relation with the casing whereby the heat of the casing is transferred to the disk, the periphery of said chamber being defined by a curved wall opposite to the periphery of the disk which is spaced from the periphery of the disk from said inlet to said outlet to provide for the admission of a solid strip of cement from the inlet and to furnish a melting passage through which cement is dragged by the disk, the width of said passage being substantially the same as the thickness of the disk, means for feeding a solid strip of thermoplastic cement to the inlet, and means for rotating the disk to deliver to the outlet cement which is melted by contact with the casing and the disk.

References Cited in the file of this patent

UNITED STATES PATENTS

| | | |
|---|---|---|
| 19,116 | Absterdam | Jan. 19, 1858 |
| 622,801 | Hoffman | Apr. 11, 1899 |
| 1,337,640 | Canda | Apr. 20, 1920 |
| 1,632,165 | Bergmann et al. | June 14, 1927 |
| 1,954,343 | August | Apr. 10, 1934 |
| 1,980,589 | Acree | Nov. 13, 1934 |
| 2,200,930 | McQueer | May 14, 1940 |
| 2,207,426 | Bailey | July 9, 1940 |
| 2,270,891 | Newhall | Jan. 27, 1942 |
| 2,301,202 | Dixon | Nov. 10, 1942 |
| 2,330,282 | Hazeltine et al. | Sept. 28, 1943 |
| 2,347,674 | Dow et al. | May 2, 1944 |
| 2,407,208 | Sherwood | Sept. 3, 1946 |
| 2,548,009 | Fether | Apr. 10, 1951 |
| 2,567,960 | Myers et al. | Sept. 18, 1951 |